(12) United States Patent
Anai et al.

(10) Patent No.: US 7,747,150 B2
(45) Date of Patent: Jun. 29, 2010

(54) IMAGE PROCESSING DEVICE AND METHOD

(75) Inventors: Tetsuji Anai, Tokyo (JP); Nobuo Kochi, Tokyo (JP); Hitoshi Otani, Tokyo (JP)

(73) Assignee: Topcon Corporation, Tokyo (JP)

( * ) Notice: Subject to any disclaimer, the term of this patent is extended or adjusted under 35 U.S.C. 154(b) by 311 days.

(21) Appl. No.: 11/730,747

(22) Filed: Apr. 3, 2007

(65) Prior Publication Data

US 2007/0236561 A1    Oct. 11, 2007

(30) Foreign Application Priority Data

Apr. 6, 2006    (JP)    .............. 2006-105569

(51) Int. Cl.
- G03B 17/00    (2006.01)
- G06K 9/00    (2006.01)
- H04N 13/02    (2006.01)

(52) U.S. Cl. .................. 396/55; 382/154; 348/50
(58) Field of Classification Search ........... 396/55, 396/222, 324, 335; 382/103, 106, 154; 348/46, 348/50, 169, 172
See application file for complete search history.

(56) References Cited

U.S. PATENT DOCUMENTS

| | | | |
|---|---|---|---|
| 6,047,134 A | 4/2000 | Sekine et al. | |
| 6,961,446 B2 | 11/2005 | Imagawa et al. | |
| 6,985,075 B2 | 1/2006 | Takeda | |
| 7,010,157 B2 | 3/2006 | Kochi et al. | |
| 7,126,630 B1 | 10/2006 | Lee et al. | |
| 7,181,081 B2 | 2/2007 | Sandrew | |
| 7,193,626 B2* | 3/2007 | Otani et al. ............ | 345/418 |
| 2001/0045979 A1* | 11/2001 | Matsumoto et al. ....... | 348/43 |
| 2001/0045980 A1 | 11/2001 | Leonard | |
| 2004/0066454 A1 | 4/2004 | Otani et al. | |
| 2007/0263924 A1 | 11/2007 | Kochi et al. | |

FOREIGN PATENT DOCUMENTS

EP    1 750 090 A2    2/2007

(Continued)

OTHER PUBLICATIONS

Koch, et al., "Automatic 3D Model Acquistition from Uncalibrated Image Sequences", Computer Graphics International, Jun. 22, 1998, pp. 597-604.*

(Continued)

*Primary Examiner*—Christopher E Mahoney
*Assistant Examiner*—Autumn Parker
(74) *Attorney, Agent, or Firm*—Foley & Lardner LLP

(57) ABSTRACT

An image processing device is provided that can precisely measure the photographing position or posture of a photographing device or the coordinates of an object based on sequentially changing photographed images. A series of sequentially photographed images are acquired, from which feature points are extracted. The feature points are tracked and correlated. Stereo images are selected from the series of photographed images correlated. Images selectable as stereo images are grouped into a group of images, from which stereo images are selected, before an orientation and a 3D measurement are performed. The images are grouped according to the distance from the object to the photographing position or the photographing magnification. Images with abrupt changes are removed so as to improve the measurement precision.

10 Claims, 12 Drawing Sheets

FOREIGN PATENT DOCUMENTS

JP        2003-264852 A      9/2003

OTHER PUBLICATIONS

Meltzer et al., "Simultaneous Localization and Mapping Using Multiple View Feature Descriptors", International Conference on Intelligent Robots and Systems, vol. 2, Sep. 28, 2004, pp. 1550-1555.*

H. P. Moravec, "Towards Automatic Visual Obstacle Avoidance", Proc. 5th International Joint Conference on Artificial Intelligence, 1977, 3 pgs.

S. Gibson et al., "Accurate Camera Calibration for Off-line, Video-Based Augmented Reality," Proceedings of the International Symposium on Mixed and Augmented Reality (ISMAR'02), Sep. 30-Oct. 1, 2002, pp. 1-10.

D. Nister et al., "Visual Odometry," Proceedings of the 2004 IEEE Computer Society Conference on Computer Vision and Pattern Recognition (CVPR'04), vol. 1, Jun. 2004, pp. 652-65.9.

Y. Yokochi et al., "Extrinsic Camera Parameter Estimation Based-on Feature Tracking and GPS Data," Computer Vision—ACCV 2006, Proceedings of the 7$^{th}$ Asian Conference on Computer Vision, Part I (Lecture Notes in Computer Science vol. 3851), 2006, pp. 369-378.

G. Medioni et al., "Generation of a 3-D Face Model from One Camera," Pattern Recognition 2002, IEEE Computer Society 16$^{th}$ International Conference, vol. 3, Aug. 11, 2002, pp. 667-671.

T. Thormählen et al., "Keyframe Selection for Camera Motion and Structure Estimation from Multiple Views," Proceedings of the ECCV 2004, 2004, pp. 523-535.

M. Pollefeys et al., "Video-to-3D," Proceedings of Photogrammetric Computer Vision 2002, 2002, pp. 1-12.

Huynh, et al., "Robust Factorization for the Affine Camera: Analysis and Comparison" Seventh International Conference on Control, Automation, Robotics and Vision, Dec. 2, 2002, pp. 126-131.

N. Kochi et al., U.S. PTO Office Action, U.S. Appl. No. 11/798,190, dated Jul. 8, 2009, 21 pgs.

U.S. Appl. No. 11/567,909, filed Dec. 7, 2006, Tetsuji Anai et al.

U.S. Appl. No. 11/905,404, filed Sep. 28, 2007, Nobuo Kochi et al.

Simon Gibson et al., Accurate Camera Calibration for Off-line, Video-Based Augmented Reality, IEEE Proceedings of the International Symposium on Mixed and Augmented Reality, 2002, pp. 1-10.

Jason Meltzer et al., Simultaneous Localization and Mapping Using Multiple View Feature Descriptors, Proceedings of IEEE/RSJ International Conference on Intelligent Robots and Systems, 2004, pp. 1550-1555.

N. Kochi et al., U.S. PTO Notice of Allowance, U.S. Appl. No. 11/798,190, dated Mar. 1, 2010, 10 pgs.

T. Anai, U.S. PTO Office Action, U.S. Appl. No. 11/567,909, dated Apr. 19, 2010, 15 pages.

N. Kochi, U.S. PTO Office Action, U.S. Appl. No. 11/905,404, dated May 4, 2010, 10 pages.

* cited by examiner

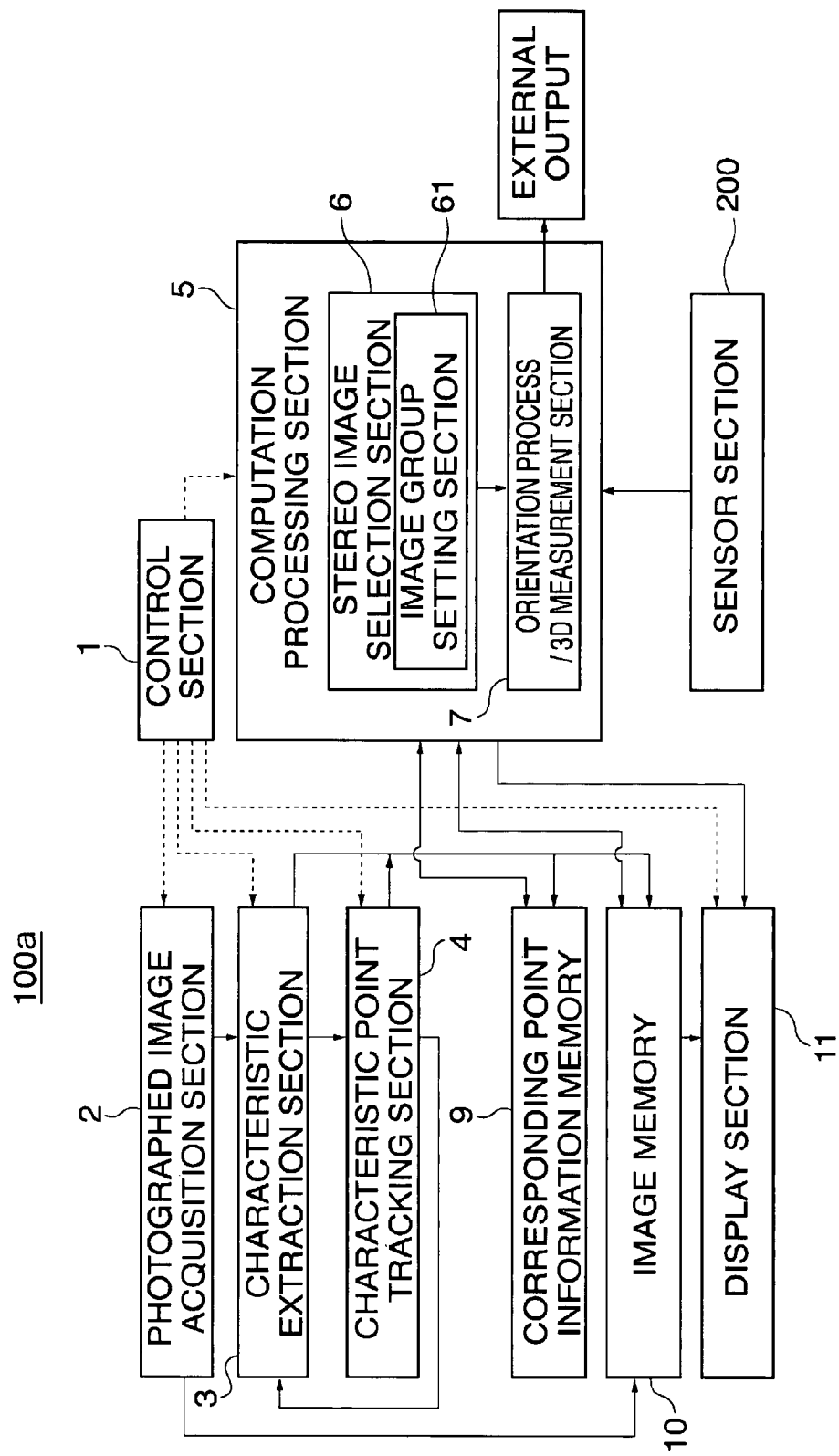

IMAGE PROCESSING DEVICE AND METHOD

BACKGROUND OF THE INVENTION

1. Technical Field

The present invention relates to an image processing device and method. More particularly, the present invention relates to an image processing device and method for measuring the coordinates of a photographing device or an object by keeping track of a dynamic image of the object taken when the photographing device moves relative to the object.

2. Related Art

There is known a technique to measure the position of a photographing device by continuously photographing an object while the photographing device is moving relative to the object. When the photographing device is actually mounted on a moving body such as a car or held in a hand of a person for photographing, however, stable images cannot always be obtained because of the sway of the car or the person, twists and turns of the road, or bumps and potholes on the road surface. Thus, it is necessary to correct vertical sway, magnification, direction and tilt for each frame. On other hand, for the case where a stationary object is photographed with a stationary photographing device, there is disclosed a 3D (three dimensional) measurement technique to precisely and automatically search for corresponding points for measurement. (See Patent Document 1.)

[Patent Document 1] JP-A-2003-264852 (paragraphs [0018] to [0073], FIGS. 1 to 11, etc.)

In order to measure the 3D coordinates of a photographing device or an object based on moving images, it is necessary to find, on two or more frames of the moving image, feature points (this may be referred to as characteristic points) corresponding to each other, or identical points on the object (hereinafter referred to "corresponding feature points") and to keep track of them. The photographing position or the 3D coordinates of the object are finally calculated from the corresponding feature points of a selected pair of images, or stereo images. A problem has been found with the calculation, however, that solutions with stable precision cannot be easily obtained if the photographing distance (magnification), photographing direction or baseline length of the stereo images changes.

Thus, it is required to provide a technique that can precisely measure the photographing position or posture of a photographing device or the coordinates of an object even for sequentially changing photographed images, such as moving images, by removing inappropriate photographed images, which might deteriorate the measurement precision of 3D measurements, by developing the technique to photograph a stationary object with a stationary photographing device described above for application to the case where one or both of them are mobile.

The objective of the present invention is to provide an image processing device and method that can precisely measure the photographing position or posture of a photographing device or the coordinates of an object based on sequentially changing photographed images, such as moving images.

SUMMARY OF THE INVENTION

To achieve the objective, an image processing device 100 related to aspect (1) of the present invention comprises: as shown in FIG. 2 for example, a photographed image acquisition section 2 for acquiring a series of sequentially photographed images of a relatively moving object where four or more adjacent images have an overlapping area with each other; a feature extraction section 3 for extracting feature points from any of the sequentially photographed images; a feature point tracking section 4 for tracking and correlating the feature points for the series of photographed images; a stereo image selection section 6 for selecting stereo images from the series of photographed images, the stereo images being a pair of images, and an orientation process/3D (three dimensional) measurement section 7 for performing an orientation and a 3D measurement using corresponding feature points, the corresponding feature points being the feature points correlated in the stereo images selected by the stereo image selection section 6, wherein the stereo image selection section 6 has an image group setting section 61 for grouping images selectable as the stereo images into a group of images, and selects stereo images from the group of images determined as belonging to one group by the image group setting section 61.

Here, referring to the term "a relatively moving object", typically the object is photographed when either one of the object or the photographing device is mobile while the other is stationary during photographing, but it may be photographed when both are mobile. That is, both may be mobile relative to each other during photographing. With four or more images having an overlapping area with each other, two pairs of stereo images can be selected. The number of images having an overlapping area is desired to be larger to improve the measurement precision of coordinates, preferably 10 or more, more preferably 50 or more, for example. The term "series of sequentially photographed images" refers to photographed images acquired sequentially over time, which may be images extracted from frames of moving images captured continuously with a video camera, or images photographed sequentially at appropriate time intervals with a still camera. Such images may be acquired from all the frames, or from every several frames, of moving images. The feature points are tracked sequentially as follows. For a feature point in a first image, a corresponding point is searched for in a second image, and when found, correlated to the feature point in the first image; then for the corresponding point in the second image now as a new feature point, a corresponding point is searched for in a third image, and when found, correlated to the feature point in the second image; etc. Here, feature points in a series of photographed images that are correlated with each other are referred to as "corresponding feature points". The feature points appear newly, disappear and reappear over time, so at least three of the series of photographed images need to have their feature points correlated to each other. Stereo images are preferably selected from corrected images, which are the series of photographed images in which the position, magnification and tilt are corrected by reflecting the corresponding feature points, but also may be selected from the images as originally acquired as they can be correlated with each other in the orientation process and 3D measurement. The term "orientation" refers to a process for calculating the photographing position and tilt of the photographing device, and the term "3D measurement" refers to a process for calculating the 3D coordinates of each feature point. The term "images selectable as stereo images" refers to stereo images suitable for 3D measurements, for example images approximately equal in distance from the object or in magnification of the photographed images as well as approximately equal in photographing direction.

With this constitution, an image processing device can be provided that can precisely measure the photographing position or posture of a photographing device or the coordinates of an object by removing inappropriate photographed images, which might deteriorate the measurement precision, from sequentially changing photographed images, such as moving images.

The aspect (2) of the present invention is the image processing device as recited in aspect (1), wherein as shown in FIG. 6 for example, the image group setting section 61 groups the series of photographed images into a plurality of groups of images according to a distance from the object to a photographing position or a photographing magnification.

With this constitution, images appropriate for 3D measurements can be grouped beforehand, allowing efficient selection of appropriate stereo images.

The aspect (3) of the present invention is the image processing device as recited in aspect (2), wherein the stereo image selection section 6 specifies, as inappropriate images, photographed images photographed while the distance from the object to the photographing position, the photographing magnification or the photographing direction is changing greatly, and selects the stereo images from photographed images excluding the specified inappropriate images. Here, photographed images photographed while the distance from the object to the photographing position, the photographing magnification or the photographing direction is changing greatly, are e.g. the images in which an overlapping area with each of the adjacent frames is 70% or less, although depending on the photographing conditions.

With this constitution, photographed images inappropriate for 3D measurements can be removed before selection of stereo images.

The aspect (4) of the present invention is the image processing device as recited in aspect (2) or (3), further comprises: a photographing position measurement section 7 for finding a position where the series of photographed images have been photographed, wherein the stereo image selection section 6 uses, as the photographing position, the position found by the photographing position measurement section 7.

With this constitution, reliable stereo images can be selected for 3D measurements.

An image processing device 100 related to aspect (5) of the present invention comprises: as shown in FIG. 2 for example, a photographed image acquisition section 2 for acquiring a series of sequentially photographed images of a relatively moving object where four or more adjacent images have an overlapping area with each other; a feature extraction section 3 for extracting feature points from any of the sequentially photographed images; a feature point tracking section 4 for tracking and correlating the feature points for the series of photographed images; a stereo image selection section 6 for selecting stereo images from the series of photographed images; and an orientation process/3D measurement section 7 for performing an orientation and a 3D measurement using corresponding feature points, the corresponding feature points being the feature points correlated in the stereo images selected by the stereo image selection section 6, wherein the stereo image selection section 6 specifies, as inappropriate images, photographed images photographed while a distance from the object to a photographing position, a photographing magnification or a photographing direction is changing greatly, and selects the stereo images from photographed images excluding the specified inappropriate images.

This constitution can provide an image processing device that can precisely measure the photographing position or posture of a photographing device or the coordinates of an object based on sequentially changing photographed images, such as moving images.

The aspect (6) of the present invention is the image processing device as recited in any one of aspects (1) to (5), wherein the stereo image selection section 6 has a correlation table defining a relationship between a baseline length of the stereo images and a measurement precision of 3D coordinates, and selects the stereo images having a baseline length satisfying a required precision based on the correlation table. Here, the baseline length denotes a distance between the optical axes of the photographing devices which photographed the stereo images.

With this constitution, 3D measurements can be performed, while satisfying the required precision.

The aspect (7) of the present invention is the image processing device as recited in any one of aspects (1) to (6), further comprises: as shown in FIG. 12 for example, a sensor section 200 for measuring a position, speed, acceleration, angle or angular speed, wherein, when a change in distance from the object to a photographing position, a change in direction of an optical axis of a photographing device or a change in tilt of the photographing device are detected based on a change over time in position, speed, acceleration, angle or angular speed output from the sensor section 200, the stereo image selection section 6 specifies, as inappropriate images, photographed images photographed while such changes are drastic, and selects the stereo images from photographed images excluding the specified inappropriate images.

Here, the sensor section 200 for measuring the position, speed, acceleration, angle or angular speed may be, for example, an inertial sensor, a GPS sensor or a posture sensor. The term "while such changes are drastic" means a period during which the degree of changes exceeds a predetermined threshold, which is set according to the photographing conditions, for example. With this constitution, inappropriate images can be removed instantaneously using such a sensor.

The aspect (8) of the present invention is an image processing method comprises: a photographed image acquisition step (S100) of acquiring a series of sequentially photographed images of a relatively moving object where four or more adjacent images have an overlapping area with each other; a feature extraction step (S110) of extracting feature points from any of the sequentially photographed images; a feature point tracking step (S120) of tracking and correlating the feature points for the series of photographed images; an image group setting step (S135) of grouping images from the series of photographed images into a group of images, the images to be grouped being selectable as stereo images; a stereo image selection step (S140) of selecting the stereo images from the group of images determined as belonging to one group in the image group setting step (S135); an orientation step (S150) of performing an orientation using the corresponding feature points, the corresponding feature points being the feature points correlated in the stereo images selected in the stereo image selection step (S140); and a 3D measurement step (S160) of performing a 3D measurement using orientation results in the orientation step (S150).

With this constitution, an image processing method can be provided that can precisely measure the photographing position or posture of a photographing device or the coordinates of an object by removing inappropriate photographed images, which might deteriorate the measurement precision, from sequentially changing photographed images, such as moving images.

An image processing method related to aspect (9) of the present invention comprises: as shown in FIG. 11 for example, a photographed image acquisition step (S100) of acquiring a series of sequentially photographed images of a relatively moving object where four or more adjacent images have an overlapping area with each other; a feature extraction step (S110) of extracting feature points from any of the sequentially photographed images; a feature point tracking step (S120) of tracking and correlating the feature points for the series of photographed images; a stereo image selection step (S140) of selecting stereo images from the series of photographed images, wherein photographed images photographed while a distance from the object to a photographing position, a photographing magnification or a photographing direction is changing greatly are specified as inappropriate images, and stereo images are selected from photographed images excluding the specified inappropriate images; an orientation step (S150) of performing an orientation using corresponding feature points, the corresponding feature points being the feature points correlated in the stereo images selected in the stereo image selection step (S140); and a 3D measurement step (S160) of performing a 3D measurement using orientation results in the orientation step (S150).

This constitution can provide an image processing method that can precisely measure the photographing position or posture of a photographing device or the coordinates of an object based on sequentially changing photographed images, such as moving images.

The aspect (10) of the present invention is a computer readable program for causing a computer to perform the image processing method as recited in aspect (8) or (9).

The present invention can provide an image processing device and method that can precisely measure the photographing position or posture of a photographing device or the coordinates of an object based on sequentially changing photographed images, such as moving images.

This application is based on the Patent Application No. 2006-105569 filed on Apr. 6, 2006 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

BRIEF DESCRIPTION OF THE DRAWINGS

FIG. 12 is a block diagram showing an exemplary configuration of an image processing device in a seventh embodiment.

DETAILED DESCRIPTION OF THE PREFERRED EMBODIMENT

The embodiments of the present invention are hereinafter described with reference to the drawings.

First Embodiment

Figure 1:
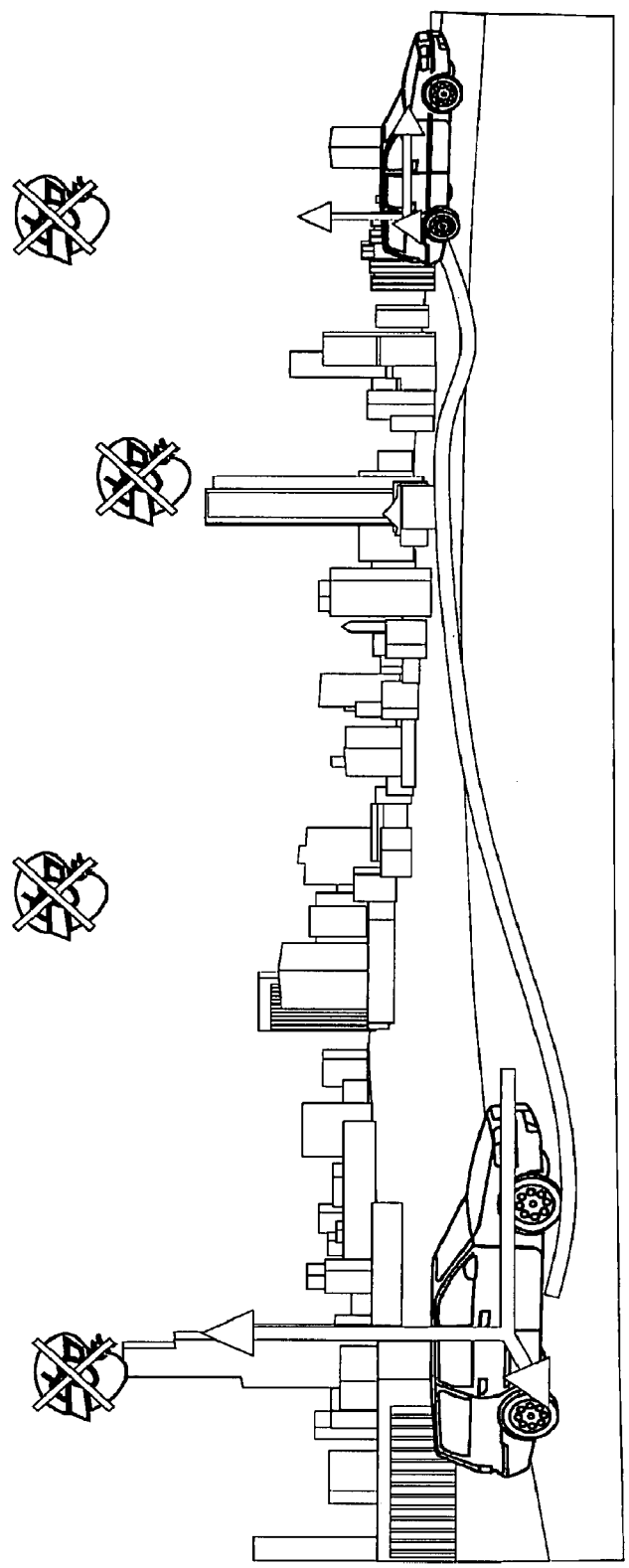
FIG. 1 is a view for explaining the concept of a first embodiment.

FIG. 1 is a view for explaining the concept of this embodiment. In this example, a camera is mounted on a car to photograph the scene of a street as an object over time, or while gradually changing the position of the car, and the positional coordinates of the camera, or the tracks of the car, are obtained from the results of tracking using the plurality of photographed images. This technique enables car navigation systems to continuously display the position of the car, and more importantly complements such systems in areas where GPS radio waves cannot be received. In the embodiment described below, images photographed during drastic motion are removed as inappropriate for use to obtain the positional coordinates of the camera.

Figure 2:
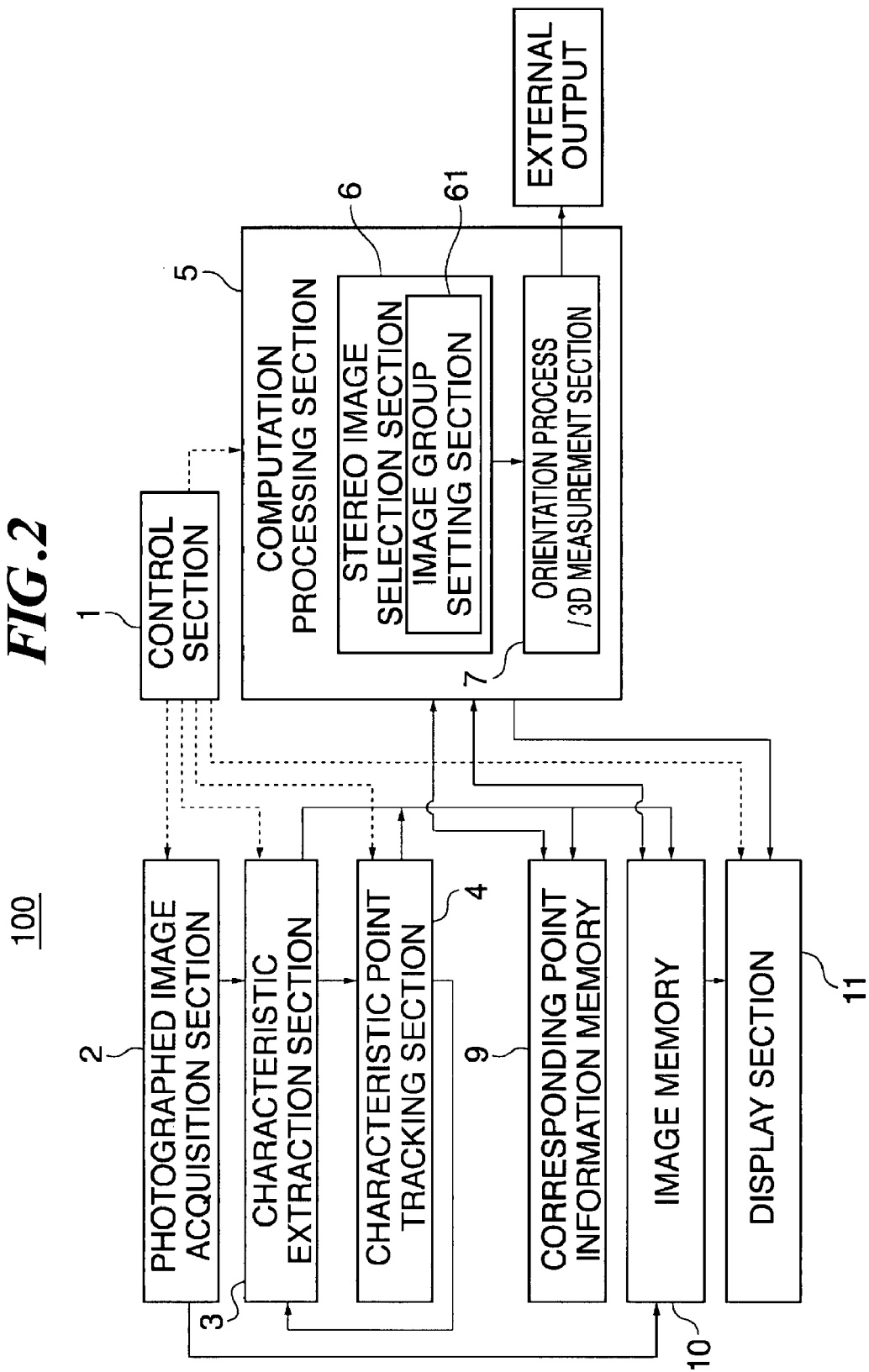
FIG. 2 is a block diagram showing an exemplary configuration of an image processing device in the first embodiment.

FIG. 2 shows an exemplary configuration of an image processing device 100 in this embodiment. In the drawing, reference numeral 1 denotes a control section for controlling respective sections of the image processing device 100 to enable it to function as an image processing device. Specifically, the control section 1 commands a photographed image acquisition section 2 to acquire photographed images, a feature extraction section 3 to extract feature points, a feature point tracking section 4 to perform tracking, a computation processing section 5 to select stereo images and to perform an orientation and a 3D measurement, etc.

Reference numeral 2 denotes a photographed image acquisition section for sequentially acquiring photographed images that change over time, such as moving images. Besides acquiring photographed images, the photographed image acquisition section 2 sends an output to the feature extraction section 3, saves the photographed images in an image memory 10, etc. Incidentally, the images may not necessarily be acquired with own photographing device, and may be acquired from other photographing devices through communication with them. Reference numeral 3 denotes a feature extraction section for extracting feature points from the sequentially acquired photographed images. The feature extraction section 3 extracts feature points from the photographed images input from the photographed image acquisition section 2, outputs the extracted feature points to the feature point tracking section 4, etc. Reference numeral 4 denotes a feature point tracking section for searching for corresponding points (which should be referred to as "candidate corresponding points" until they are firmly determined, to be exact; in this embodiment, however, they are simply referred to as "corresponding points" too) corresponding to the feature points input from the feature extraction section 3 to keep track of the feature points. Besides the tracking process, the feature point tracking section 4 outputs the tracking results to a corresponding point information memory 9, judges the arrangement of the corresponding points, commands the feature extraction section 3 to establish new feature points, etc. The series of photographed images for which feature points have been correlated, or to which corresponding feature points have been added, by the feature points tracking section 4 are stored in the image memory 10 as corrected images in which the magnification, sway and tilt are corrected, together with the images as originally acquired.

Reference numeral 5 denotes a computation processing section having a stereo image selection section 6 and an orientation process/3D measurement section 7. The stereo image selection section 6 selects stereo images from the series of images to which corresponding feature points have been added by the feature extraction section 3 and the feature extraction section 4. The stereo image selection section 6 has an image group setting section 61 for grouping images selectable as stereo images into groups of images, and selects stereo images from the group of images determined as belonging to one group by the image group setting section 61. The orientation process/3D measurement section 7 uses the stereo images selected by the stereo image selection section 6 to perform an orientation calculation and a 3D measurement. Besides, the orientation process/3D measurement section 7 outputs the orientation results and the 3D measurement results to a display section 11, to the outside, etc. At minimum one pair of stereo images are necessary for an orientation calculation and a 3D measurement. The precision can be improved by a statistical process such as averaging using more pairs of stereo images.

Reference numeral 11 denotes a display section for two-dimensionally or stereoscopically displaying an image of the object subjected to an orientation process or a 3D measurement by the computation processing section 5 or the tracks of the photographing position. Reference numeral 9 denotes a corresponding point information memory for storing information of feature points and their respective corresponding points (including candidate corresponding points). Reference numeral 10 denotes an image memory for storing photographed images, corrected images and other images. The corresponding point information memory 9 and the image memory 10 are referenced and overwritten as necessary, such as when feature points are tracked, when stereo images are selected, during orientation calculations and 3D measurements, and at other appropriate times.

Figure 3:
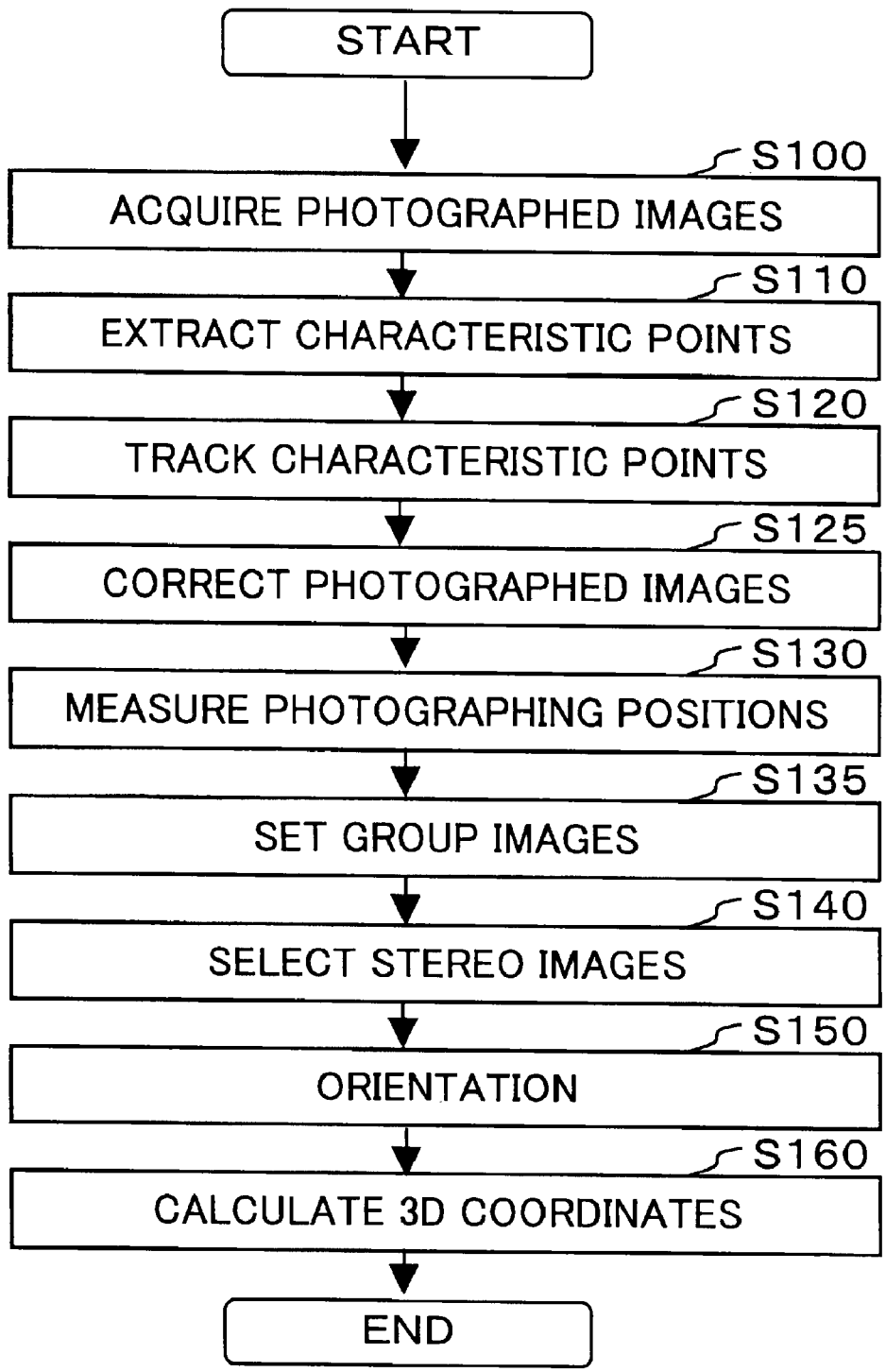
FIG. 3 is an exemplary flowchart of an image processing method in the first embodiment.

FIG. 3 is an exemplary flowchart of an image processing method in the first embodiment. First of all, the photographed image acquisition section 2 acquires a series of photographed images that change over time, such as moving images, of a relatively moving object (S100: photographed image acquisition step). Four or more successive ones of the series of photographed images should have an overlapping area with each other. The photographed image acquisition section 2 may acquire images with its own photographing camera, or may acquire images photographed with other photographing devices via a communication line. The control section 1 sequentially sends the photographed images that change over time, such as moving images, from the photographed image acquisition section 2 to the feature extraction section 3. In this embodiment, a photographing camera is mounted on a car to perform photographing while the car is traveling. Thus, the photographed images change gradually in terms of time or space and hence the photographed objects are generally common in the photographed images. The feature extraction section 3 extracts feature points from any of the photographed images photographed over time (S110: feature extraction step). The data of the extracted feature points are sent to the feature point tracking section 4 and stored in the corresponding point information memory 9. The feature point tracking section 4 searches for corresponding points corresponding to the feature points for the series of photographed images, correlates them, and tracks the feature points (S120: feature point tracking step). The feature points are tracked sequentially as follows. For a feature point in a first image, a corresponding point is searched for in a second image, and when found, correlated to the feature point in the first image; then for the corresponding point in the second image now as a new feature point, a corresponding point is searched for in a third image, and when found, correlated to the feature point in the second image; etc. Here, feature points in a series of photographed images that are correlated with each other are referred to as "corresponding feature points". The data of the corresponding feature points are sequentially sent to the computation processing section 5 and stored in the corresponding point information memory 9. The photographed images to which corresponding feature points have been added are stored in the image memory 10 as corrected images in which the magnification, sway and tilt are corrected (S125). If the data of the feature points extracted by the feature extraction section 3 and the data of the corresponding feature points correlated by the feature point tracking section 4 are sequentially sent to the computation processing section 5 in real time, it is highly likely that an orientation process and a 3D measurement can be performed in the moving body (car) in motion so that the results can be reflected to a navigator early.

Then, the photographing position measurement section measures the photographing position (S130: photographing position measurement step). This step allows the photographed images constituting stereo images to be grouped based on the photographing position. Since stereo cameras are by nature installed in parallel to an object to be photographed, the distance from the object is preferably constant, but not necessarily with high precision. The photographing position measurement section for measuring the photographing position may be replaced if it has an orientation function of an ordinary orientation process/3D measurement section 7. In this embodiment, the orientation process/3D measurement section 7 serves also as a photographing position measurement section.

Then, the image group setting section 61 groups images selectable as stereo images, from the series of photographed images, into groups of images (S135: image group specifying step). The image group setting section 61 groups the series of photographed images into plural groups of images according to the distance from the object to the photographing position or the photographing magnification.

Then, the stereo image selection section 6 selects stereo images from the series of photographed images to which corresponding feature points have been added (S140: stereo image selection step). The stereo image selection section 6 selects stereo images from the group of images determined as belonging to one group by the image group setting section 61. The series of images are preferably corrected images in which the magnification, sway and tilt are corrected by reflecting the corresponding feature points, but also may be selected from the images as originally acquired as they can be correlated with each other in the following orientation process and 3D measurement. Here, corrected images are used.

Figure 4:
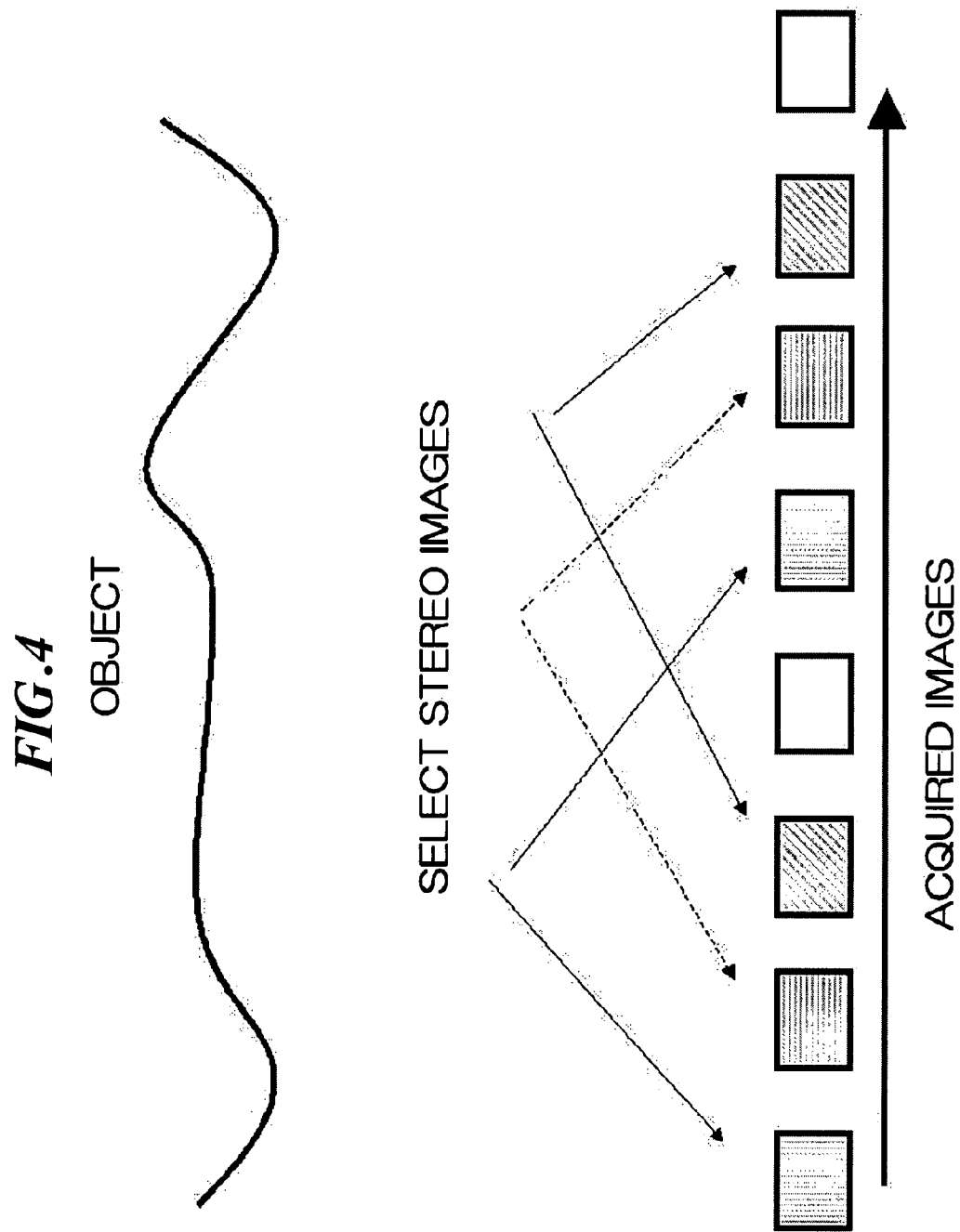
FIG. 4 shows an example of selecting stereo images.

FIG. 4 shows an example of selecting stereo images. In this example, an acquired image and an image several frames away therefrom are selected as stereo images. It is preferable to select pairs of images with the same intervals between the frames, because in this way the baseline lengths are kept approximately constant. At minimum one pair of stereo images need to be selected. The precision can be improved by a statistical process, such as averaging, using more pairs of stereo images. Here, a large number of stereo images are selected from a large number of photographed images subjected to tracking, and subjected to such a statistical process.

Returning to FIG. 3, the orientation process/3D measurement section 7 performs an orientation process and a 3D measurement using the corresponding feature points of the stereo images selected by the stereo image selection section 6. The orientation process uses the coordinates of the feature points and the corresponding points for the selected stereo images to determine the relative orientation, so as to calculate the photographing position and tilt of the photographing camera (S150: orientation step). A connection orientation for the stereo images is also performed. For the photographed images where a pair of stereo images cannot be set, a single photograph orientation can be performed to calculate the photographing position and tilt of the photographing camera. Then, a 3D measurement is performed using the orientation results to calculate the 3D coordinates of the respective feature points (S160: 3D measurement step). The 3D measurement uses the position and tilt of the photographing camera (exterior orientation elements) obtained in the orientation step as initial values, for example, and performs a bundle adjustment to obtain the 3D coordinates. In this way, not only the 3D coordinates but also more accurate position and tilt of the photographing camera can be obtained.

The respective processes are described below as necessary.

[Feature Point Extraction]

Figure 5:
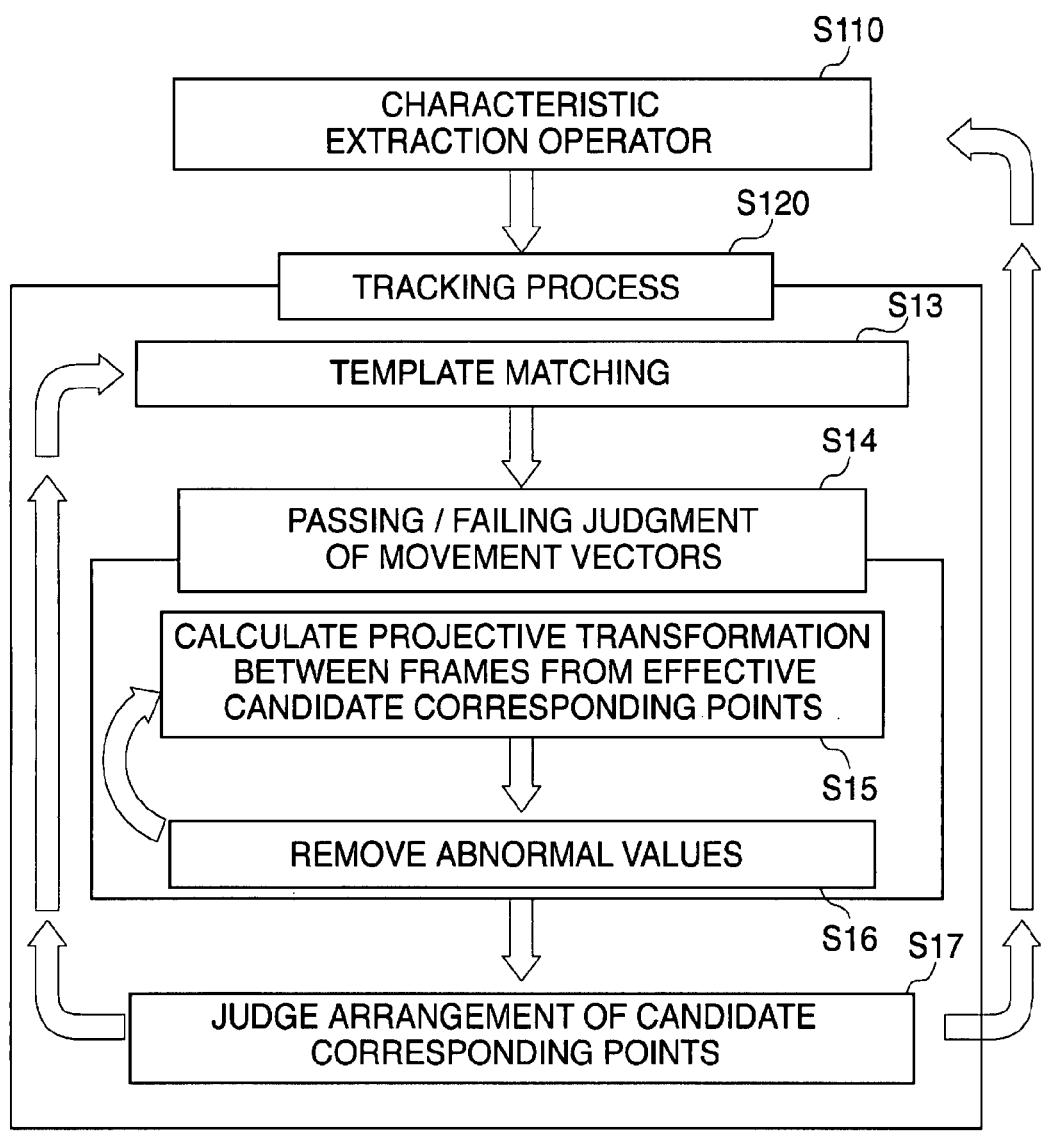
FIG. 5 is an exemplary flowchart of tracking feature points.

The feature extraction section 3 extracts feature points from each photographed image (S110; see FIG. 5). Typically, feature points are extracted from the entire screen in the initial frame, and from an area of the screen which does not overlap with that in the initial frame in subsequent frames. The extraction of feature points in the initial frame may appropriately employ, for example, a MORAVEC operator (H. P. Moravec. Towards Automatic Visual Obstacle Avoidance. Proc. 5th International Joint Conference on Artificial Intelligence, pp. 584, 1977.), or other operators such as Hariss, Pressy and Susan.

[Tracking Process]

FIG. 5 is an exemplary flowchart of tracking feature points. The feature point tracking section 4 performs a tracking process for each feature point selected in the feature extraction step (S120). That is, the feature point tracking section 4 obtains corresponding points corresponding to the feature points, obtains the movement vectors of the feature points and the screen relative movement amount, and in addition, links these to obtain the movement tracks. The term "screen relative movement amount" refers to the amount of relative movement on the screen between the photographing camera and the object to be photographed. The term "movement vectors" refers to vectors of relative movement of respective feature points on 2D photographed images. When tracking the feature points, first of all, a template matching is performed on successive adjacent photographed images (S13) to obtain corresponding points corresponding to the feature points. In this way, the movement vectors of the respective feature points can be obtained. By using successive adjacent photographed images to perform a projective transformation (S15), the screen relative movement amount relative to the photographing camera can be obtained. On the assumption that the time interval between frames is significantly short and hence the overall movement between frames can be generally approximated by a projective transformation, a projective transformation is performed to estimate the screen relative movement amount. Then, the movement vectors of the respective feature points are compared with the screen relative movement amount between frames to judge whether the movement vectors are passing or failing (S14). Then, corresponding points that show abnormal movement and hence can be considered as erroneous corresponding points are removed (S16). Repeating the steps S15 and S16 improves the precision of the projective transformation. The term "erroneous corresponding points" refers to feature points that might deteriorate the precision of 3D measurements (and hence that might adversely affect orientations), including feature points given to an object that moves differently from the object to be photographed, besides feature points that do not actually correspond to each other but have been correlated erroneously.

Next, a judgment is made as to the arrangement of the candidate corresponding points (S17). That is, the arrangement of the feature points and the corresponding points on the photographed images is checked. In the case where the arrangement of the feature points is so deviated as to create a vacant area, the feature extraction section 3 is commanded to establish new feature points in the vacant area. Then, the process returns to the feature extraction (S110) to repeat the feature extraction (S110) and the tracking step (S120) sequentially for new successive images in real time. If the feature extraction has been finished for the series of photographed images, the process returns to the template matching (S13) to posteriorly and collectively perform the tracking step (S120) sequentially for new successive images.

To keep track of the feature points, the template matching is used, for example (S13). Successive images are sequentially selected as stereo pairs from the acquired photographed images. The selected images are subjected to a stereo matching, for example an SSDA (Sequential Similarity Detection Algorithm) method, to obtain corresponding points (S13). The SSDA method determines the degree of similarity using a residual. By the SSDA method, the position where the residual of a part of a matrix is minimum is obtained as a corresponding point. The SSDA template matching is relatively fast among other template matching schemes, and considered easily adaptable to hardware processing. Other schemes such as a normalized correlation method may be employed. In the template matching, it is important to select optimum template size and search range. An optimum search range can be set based on the frame rate of the video camera, the traveling speed, etc.

Erroneous corresponding points can be created in the case where feature points are added to a moving object such as a car running, a person, a bird flying or a leaf falling, or in the case where the camera sways drastically. The camera sway can be corrected through the projective transformation. On the other hand, an object that moves differently from the object to be photographed can create erroneous corresponding points. Thus, removing erroneous corresponding points that were created by the movement of such an object can improve the reliability of the feature points (which include corresponding points and candidate corresponding points) and the precision in the judgment of mismatching, thereby coping with even significant sway of the video camera.

[Setting Image Group]

The image group setting section 61 groups images selectable as stereo images into groups of images. The image group setting section 61 groups the series of photographed images into a plurality of groups of images according to the distance from the object to the photographing position or the photographing magnification.

Figure 6:
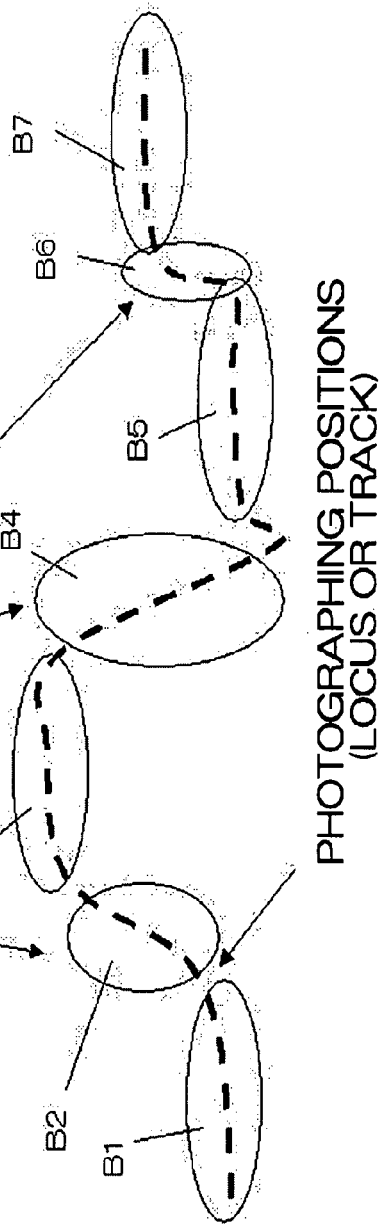
FIG. 6 shows an example of grouping images.

FIG. 6 shows an example of grouping images. In this example, photographed images with an approximately constant distance between the photographing camera and the object, or with an approximately constant magnification, are grouped into groups of images. The photographed images in respective photographing position blocks B1, B3, B5 and B7 are approximately constant in distance between the photographing camera and the object, or in magnification. Thus, they can be grouped into four groups, from each of which stereo images can be selected. The photographed images belonging to the blocks B1 and B5, and B5 and B7, are not significantly different from each other in distance between the photographing camera and the object. Thus, stereo images can also be selected from these combinations of images. In this case, the blocks B1 and B5 are combined together to form one group of images B15, and the blocks B5 and B7 are combined together to form one group of images B57, resulting in a total of six groups. It is preferable to select images with baseline lengths required for measurement precision.

Also, images photographed while the photographing position is changing greatly relative to the object also can be specified from FIG. 6. In images which vary drastically, such as those photographed from photographing position blocks B2, B4 and B6, the photographing distance, magnification and direction change greatly and the baseline length is not ensured. These groups of images are specified and excluded from groups of images to be selected. The "images photographed while the photographing position is changing greatly" are images having an overlapping area of 70% or less with adjacent frames, for example, although depending on the photographing conditions.

Figure 7:
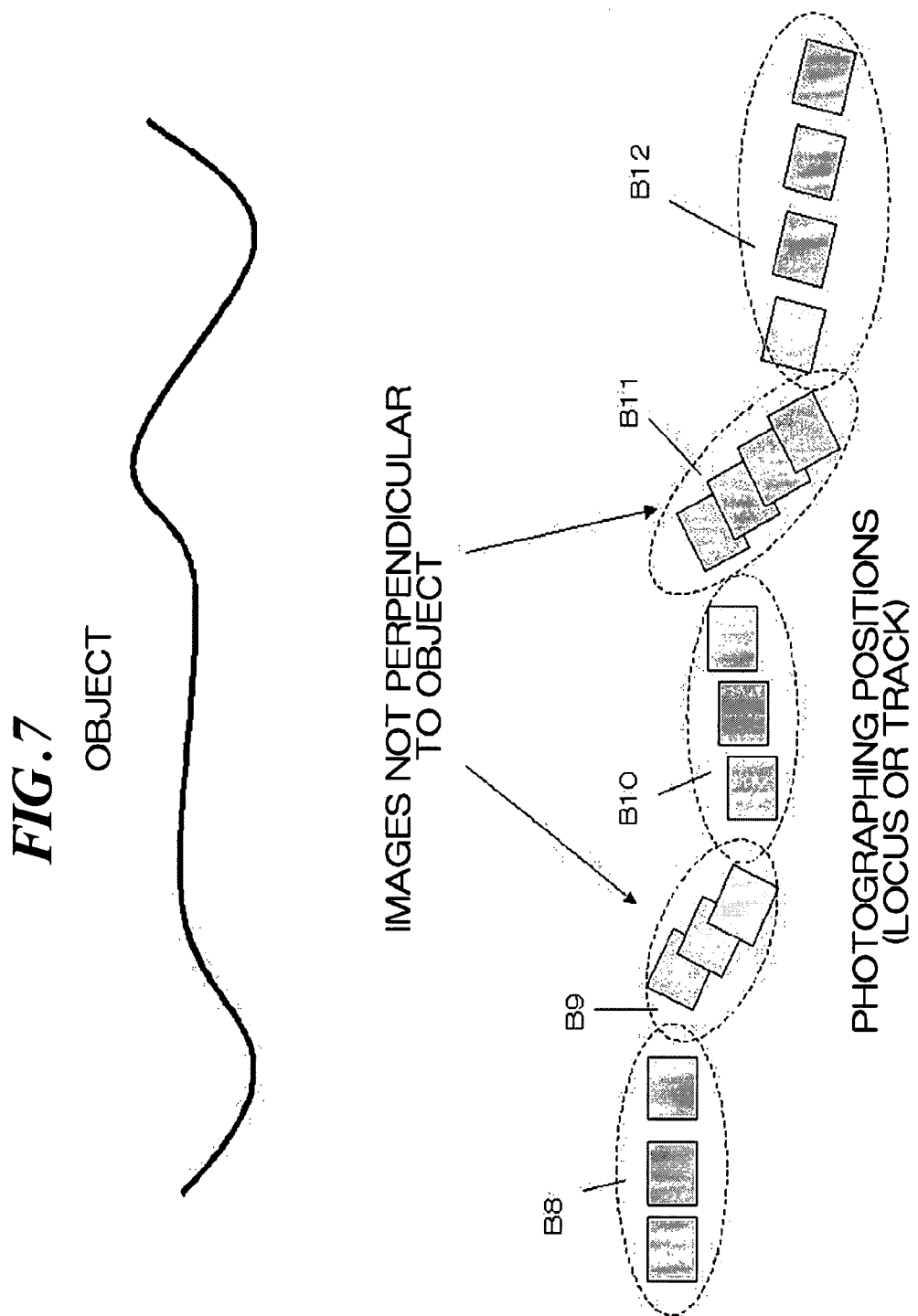
FIG. 7 shows another example of grouping images.

FIG. 7 shows another example of grouping images. In FIG. 7, images in approximately the same direction relative to the object are selected. The photographed images in photographing position blocks B8, B10 and B12 are approximately constant in direction of the photographing camera relative to the object. Thus, they are grouped into three groups of images, from each of which stereo images can be selected. On the other hand, images that are not right facing to the object, such as those in blocks B9 and B11, are unstable and hence excluded from groups of images to be selected. Stable stereo images can be more easily obtained from images at the same photographing distance rather than from images in the same direction. Thus, the method of FIG. 7 is preferably applied together with that of FIG. 6, rather than applied independently thereof.

[Stereo Image Selection]

Figure 8:
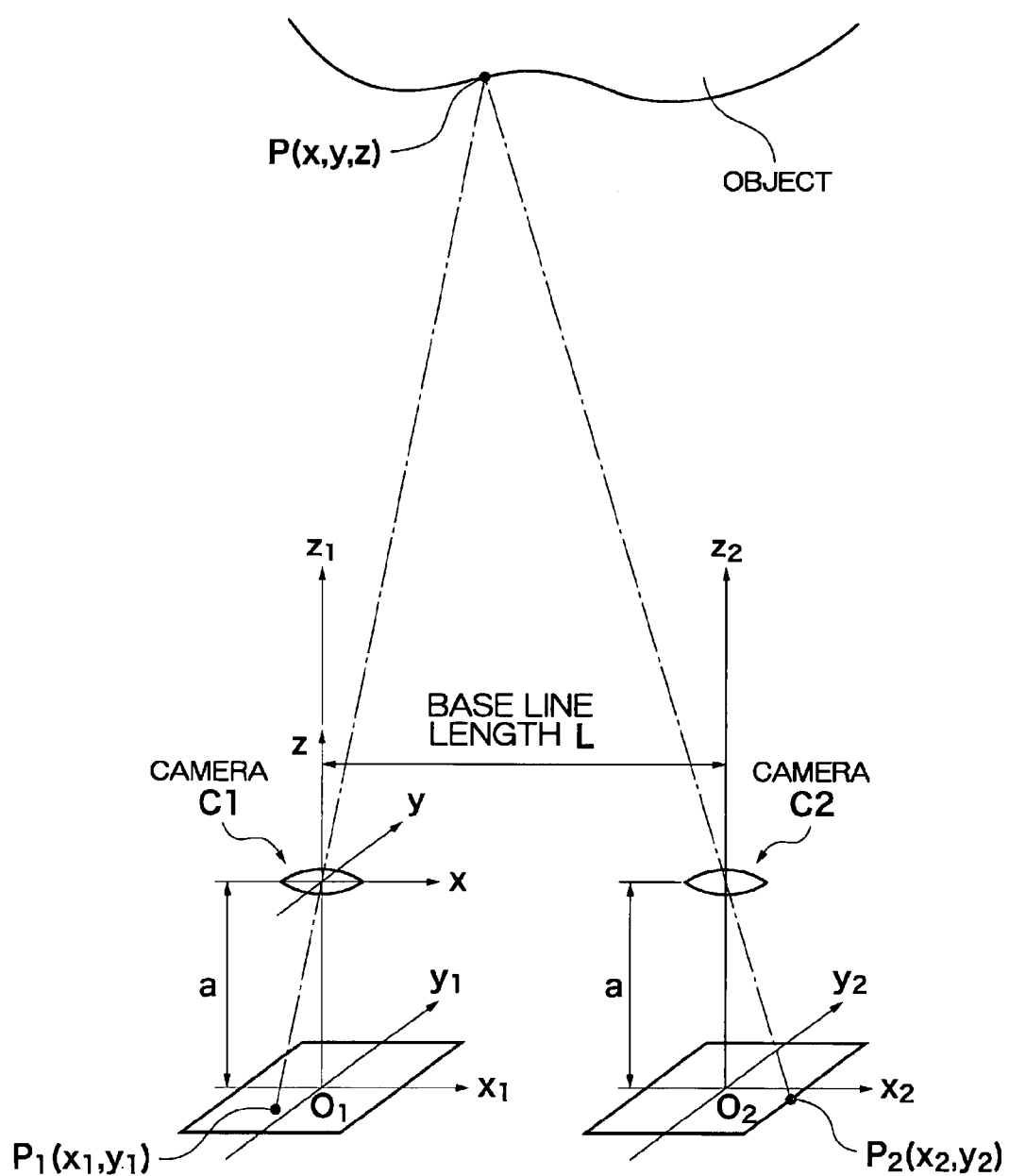
FIG. 8 is a diagram for explaining a stereo method.

FIG. 8 is a diagram for explaining a stereo method. For simplicity, it is assumed that two cameras C1 and C2 of the same specifications are used. The optical axes of the cameras C1 and C2 are parallel to each other, the distances "a" from the principal point of the camera lens to the CCD surface are the same, and the CCDs are disposed perpendicular to the optical axes. The distance between the optical axes of the two cameras C1 and C2 (baseline length) is represented as "L".

The coordinates of a point P1 (x1, y1) and a point P2 (x2, y2) on the CCD surface formed from a point P (x, y, z) on an object have the following relationship:

$$x1 = ax/z \quad (1)$$

$$y1 = y2 = ay/z \quad (2)$$

$$x2 - x1 = aL/z \quad (3)$$

Note that the origin of the entire coordinate system (x, y, z) is located at the principal point of the lens of the camera C1.

"z" can be obtained from the equation (3), and "x" and "y" can then be obtained using the "z" from the equations (1) and (2).

As can be understood from the explanation of the stereo method, if the photographing distances (magnifications), directions and baseline length L of the cameras C1 and C2 change, this principle becomes less likely to hold and as a result it becomes more difficult to obtain solutions with stable precision.

Equations for obtaining one pixel resolution in the stereo method are given below.

In the case where two photographed images are used for measurement, the theoretical resolution for one pixel can normally be obtained from the following equations.

In-plane resolution: $\Delta xy = H \times \Delta p / f$ (4)

Height resolution: $\Delta z = H \times H \times \Delta p / (B \times f)$ (5)

where "H" represents photographing distance, "$\Delta p$" represents pixel resolution, "f" represents screen distance, and "B" represents photographing baseline length.

Also from these equations, it can be understood that the photographing distance and the baseline length are important parameters for one pixel resolution.

In actual orientations and 3D measurements, one pixel resolution can be calculated properly using all these parameters, such as the photographing distance, baseline length and photographing direction, for corrections and adjustments.

From a viewpoint of obtaining stable and precise solutions, however, the use of these parameters with different values might be a factor of solutions with unstable precision because of the basic principle. Thus, when stereo images are selected, images with approximately the same photographing distance, magnification and camera direction (parameters of which can be obtained from the photographing position of the camera) are grouped into a group of images, and stereo images for use in a 3D measurement are selected from one group of images.

[Relative Orientation Process]

Next, an orientation calculation is described.

Figure 9:
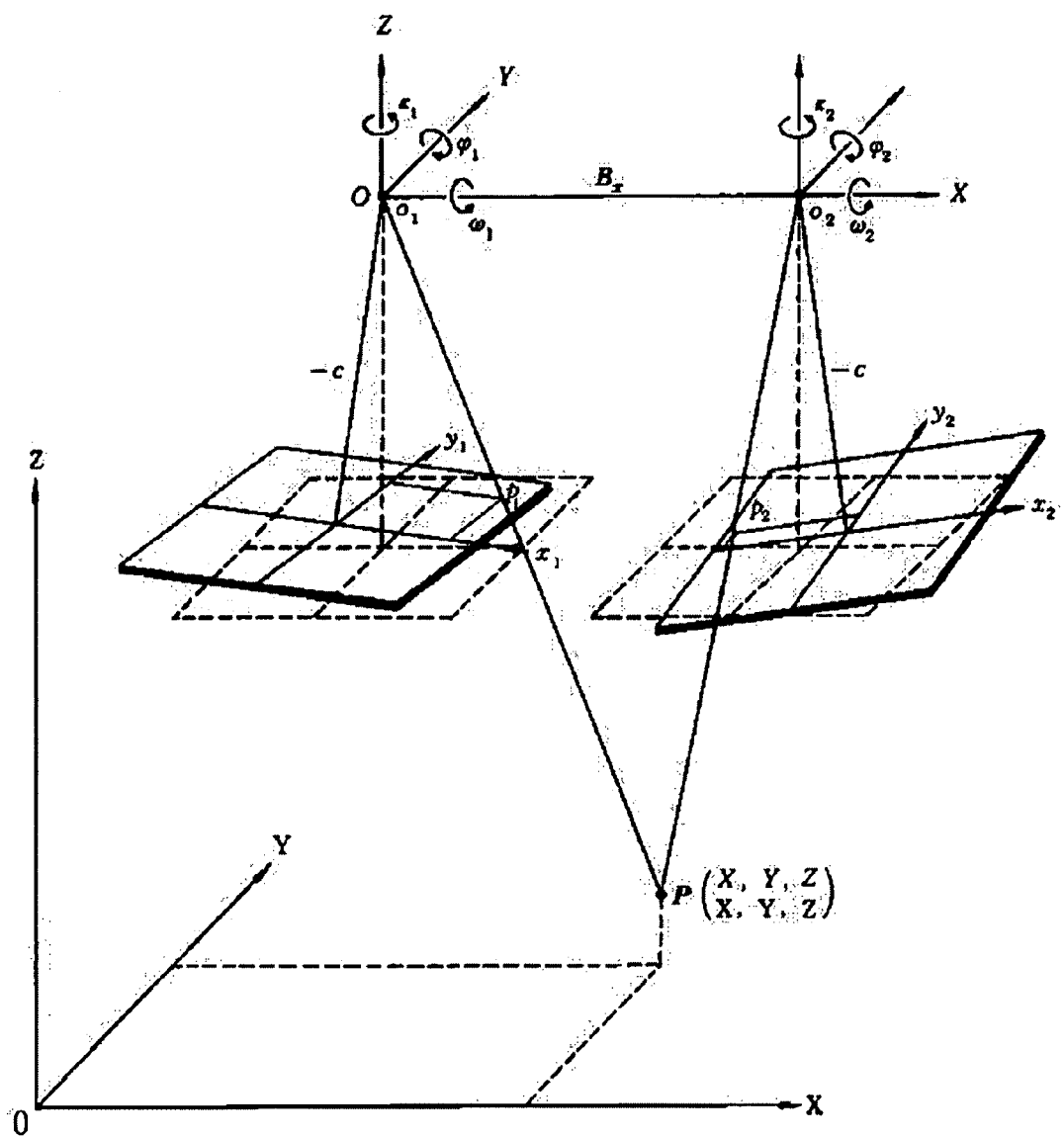
FIG. 9 is a diagram for explaining a relative orientation.

FIG. 9 is a diagram for explaining a relative orientation. The origin of a model coordinate system is located at the left projection center, and the line connecting it and the right projection center is used as the X-axis. As for the reduction scale, the baseline length is used as the unit length. Parameters to be obtained are five rotational angles, namely Z-axis rotational angle $\kappa_1$ and Y-axis rotational angle $\phi_1$ of the left camera, and Z-axis rotational angle $\kappa_2$, Y-axis rotational angle $\phi_2$ and X-axis rotational angle $\omega_2$ of the right camera. X-axis rotational angle $\omega_1$ the left camera is 0 and thus need not be considered.

First of all, the parameters required to decide the positions of the left and right cameras are obtained from the coplanarity condition equation (6) below:

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = C \quad (6)$$

$X_{01}, Y_{01}, Z_{01}$: projection center coordinates of left image
$X_{02}, Y_{02}, Z_{02}$: projection center coordinates of right image
$X_1, Y_1$: image coordinates of left image
$X_2, Y_2$: image coordinates of right image Under the above conditions, the coplanarity condition equation (6) can be transformed into the equation (7), and the respective parameters can be obtained by solving the equation (7):

$$F(\kappa_1, \phi_1, \kappa_2, \phi_2, \omega_2) = \begin{vmatrix} Y_1 & Z_1 \\ Y_2 & Z_2 \end{vmatrix} \quad (7)$$
$$= Y_1 Z_2 - Y_2 Z_1$$
$$= 0$$

Here, such coordinate transformation relations (8) and (9) as given below hold between the model coordinate system XYZ and the camera coordinate system xyz:

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \quad (8)$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \quad (9)$$
$$\begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Using these equations, unknown parameters are calculated by the following procedures:

(i) Initial approximate values of the parameters ($\kappa_1, \phi_1, \kappa_2, \phi_2, \omega_2$) are normally 0.
(ii) A derivative coefficient obtained when the coplanarity condition equation (7) is linearized, or Taylor-expanded, around the approximation is obtained from the equations (8) and (9), to formulate an observation equation.
(iii) A least squares method is applied to calculate correction amounts for the approximate values.
(iv) The approximate values are corrected.
(v) Using the corrected approximate values, the operations (ii) to (v) are repeated until a convergence is achieved.

If a convergence is achieved, a connection orientation is performed in addition. This process standardizes the tilts and reduction scales of respective models to be represented in an identical coordinate system.

To perform this process, connection differentials represented by the following equations are calculated:

$\Delta X_j = (X_{jr} - X_{jl})/(Z_0 - Z_{jl})$ $\Delta Y_j = (Y_{jr} - Y_{jl})/(Z_0 - Z_{jl})$ $\Delta Z_j = (Z_{jr} - Z_{jl})/(Z_0 - Z_{jl})$ $\Delta D_j = \sqrt{(\Delta X_j^2 + \Delta Y_j^2)}$ $(\Delta X_{jl}, \Delta Y_{jl}, \Delta Z_{jl})$: j-th left model in standardized coordinate system
$(\Delta X_{jr}, \Delta Y_{jr}, \Delta Z_{jr})$: j-th right model in standardized coordinate system If $\Delta Zj$ and $\Delta Dj$ are 0.0005 (1/2000) or less, the connection orientation is considered to have been performed properly. If it was not performed properly, orientation results with an error indication are output to show which part of the image is not suitable. In this case, other orientation points on the image, if any, are selected to repeat the above calculations (ii) to (v). If it does not work, the arrangement of the orientation points is changed.

[Bundle Adjustment]

Next, description is made of a bundle adjustment for use in a 3D measurement. The bundle adjustment is based on collinearity condition equations indicating that object space coordinates (X, Y, Z), their corresponding image coordinates (x, y), and the projection center ($X_0, Y_0, Z_0$) are on the same line, as defined by the equation (10):

$$\left. \begin{aligned} x &= -f \frac{a_1(X - X_0) + a_2(Y - Y_0) + a_3(Z - Z_0)}{a_7(X - X_0) + a_8(Y - Y_0) + a_9(Z - Z_0)} + dx \\ y &= -f \frac{a_4(X - X_0) + a_5(Y - Y_0) + a_6(Z - Z_0)}{a_7(X - X_0) + a_8(Y - Y_0) + a_9(Z - Z_0)} + dy \end{aligned} \right\} \quad (10)$$

$a_1 = \cos\phi\cos\kappa$, $a_2 = -\cos\phi\sin\kappa$, $a_3 = \sin\phi$ $a_4 = \cos\omega\sin\kappa + \sin\omega\sin\phi\cos\kappa$, $a_5 = \cos\omega\cos\kappa - \sin\omega\sin\phi\sin\kappa$, $a_6 = -\sin\omega\cos\phi$ $a_7 = \sin\omega\sin\kappa - \cos\omega\sin\phi\cos\kappa$, $a_8 = \sin\omega\cos\kappa + \cos\omega\sin\phi\sin\kappa$, $a_9 = \cos\omega\cos\phi$ f: screen distance (focal length)
x, y: image coordinates
X, Y, Z: object space coordinates (reference point, unknown point)
$X_0, Y_0, Z_0$: photographing position of camera
$a_1 \sim a_9$: tilt of camera (elements of 3×3 rotation matrix)
dx, dy: terms for correcting interior orientation of camera Observation equations are formulated for all the object space points based on the equation (10), to obtain simultaneous solutions for the exterior orientation elements and the object space coordinates, which are the position and tilt of the camera at the time of photographing, by the least squares method. In this case, the equation (10) is a nonlinear equation and hence requires initial values of the exterior orientation elements, the object space points, and the focal length of the camera. For the initial values of the exterior orientation elements and the object space points, those values obtained in the orientation process are used. For the initial value of the focal length of the camera, an approximate value of the focal length at the time of photographing is entered. Now that the position and posture of the camera are known from the 3D measurement, the 3D coordinates of the corresponding points can be calculated by a forward intersection method, for example.

Figure 10:
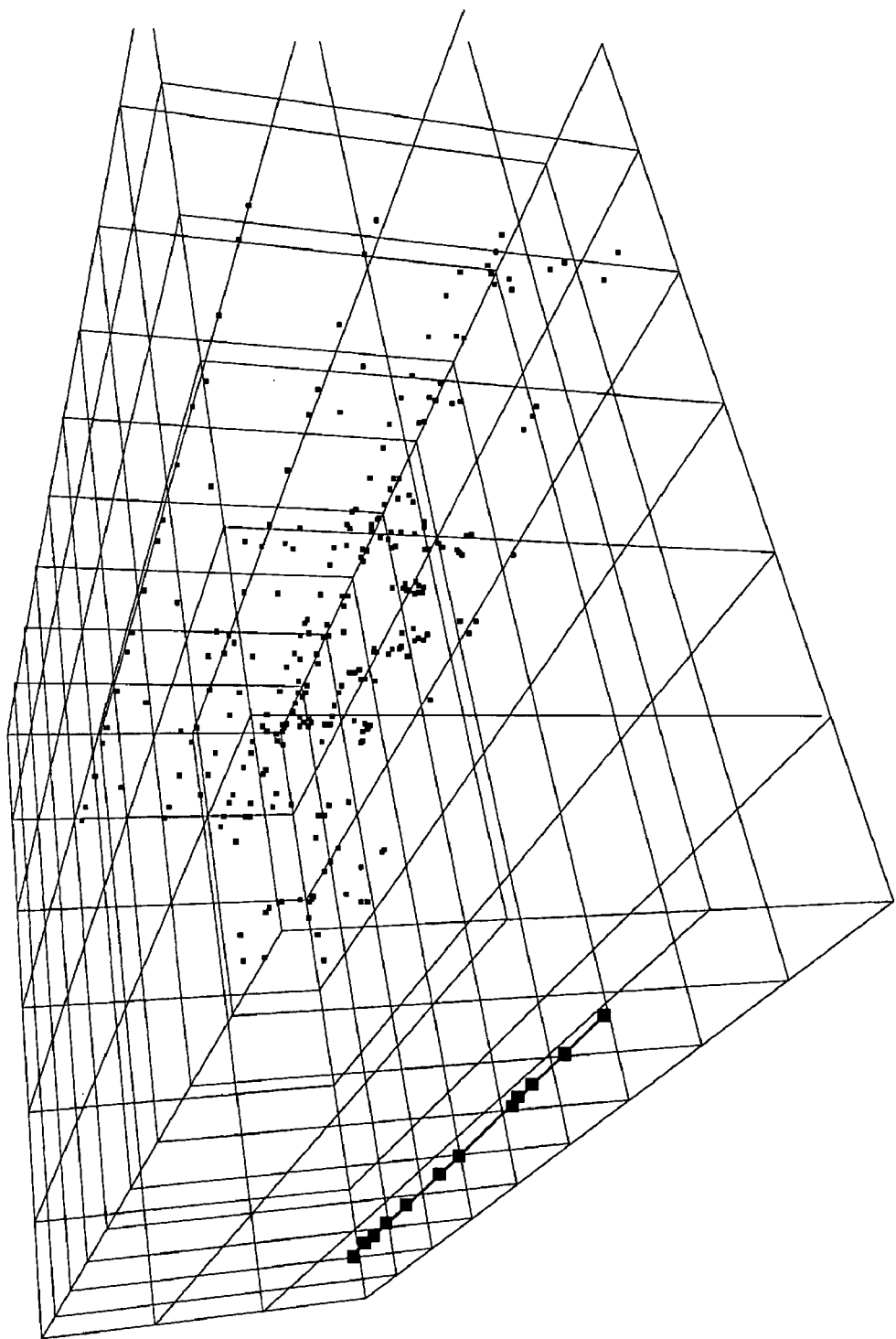
FIG. 10 shows an exemplary result of a 3D measurement.

FIG. 10 shows exemplary results of a 3D measurement. In this stereoscopic drawing, the points arranged generally in a line in the lower left represent the obtained photographing positions, and the smaller points plotted all over in the 3D shape represent the corresponding feature points that are given 3D coordinate values.

As described above, this embodiment makes it possible to remove beforehand inappropriate photographed images, which might deteriorate the measurement precision of 3D measurements, from sequentially changing photographed images, such as moving images. Thus, this embodiment can provide an image processing device and method that can precisely measure the photographing position or posture of a photographing device or the coordinates of an object based on sequentially changing photographed images, such as moving images.

Second Embodiment

In the first embodiment, the image group setting section groups photographed images according to the distance from the object to the photographing position, and the stereo image selection section selects stereo images from the group of images determined as belonging to one group, and specifies images photographed while the photographing position from the object to the photographing position, etc., is changing greatly, so that stereo images will not be selected from such images. In this embodiment, the image group setting section groups photographed images according to the distance from the object to the photographing position, or magnification, and the stereo image selection section selects stereo images from the group of images determined as belonging to one group. Images photographed while the photographing position is changing greatly are not actively removed. However, photographed images approximately equal in distance to the photographing position are grouped, so that stereo images at approximately equal in distance to the photographing position can be selected. This allows appropriate and efficient selection of stereo images. This embodiment is otherwise similar to the first embodiment. The image processing device in this embodiment may be the image processing device 100 in the first embodiment shown in FIG. 2. The process flow in this embodiment may be the same as that shown in FIG. 3.

Third Embodiment

Figure 11:
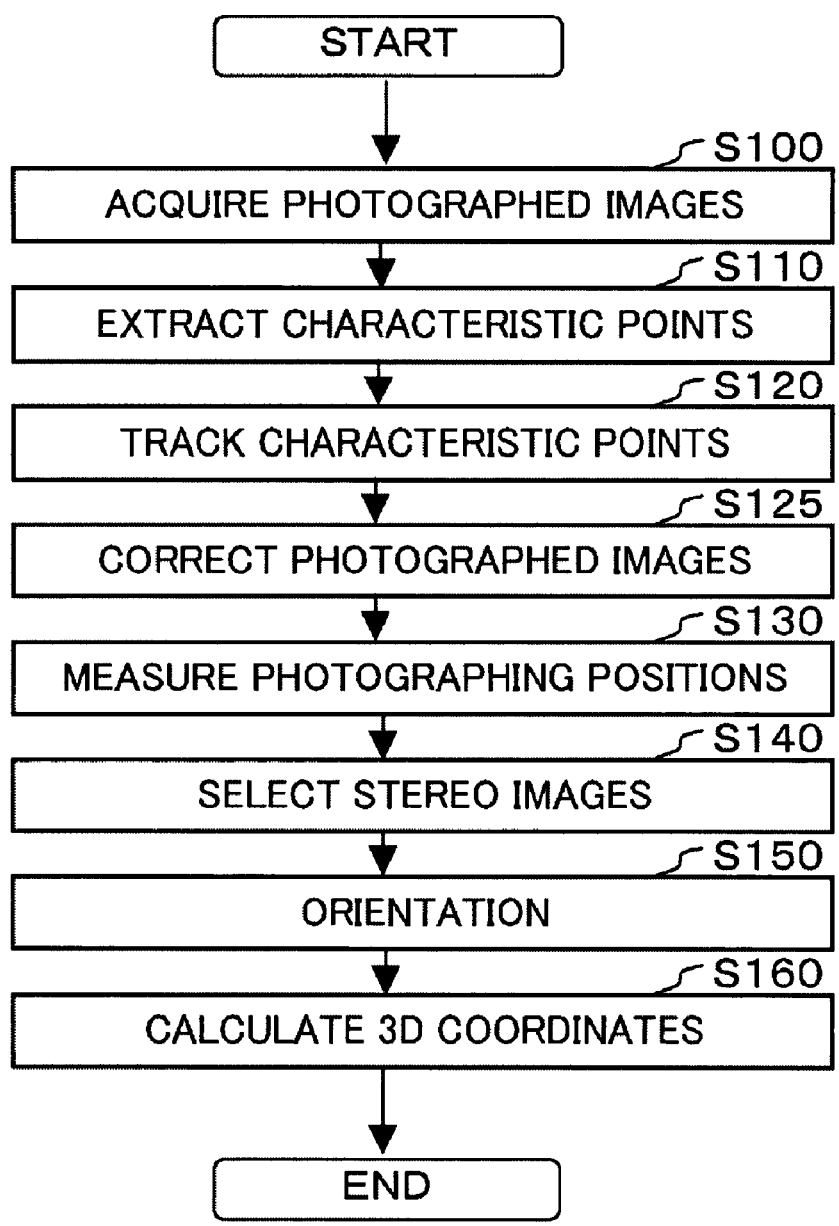
FIG. 11 shows an exemplary flowchart of an image processing method in a third embodiment.

In the first embodiment, the image group setting section groups photographed images according to the distance from the object to the photographing position, and the stereo image selection section selects stereo images from the group of images determined as belonging to one group, and specifies images photographed while the photographing position from the object to the photographing position, etc., is changing greatly, so that stereo images will not be selected from such images. In this embodiment, the stereo image selection section specifies images photographed while the photographing position is changing greatly, so that stereo images will not be selected from such images. In this case, the photographed images are not grouped. However, unstable images photographed while the photographing position is changing greatly are removed before stereo images are selected. Thus, stereo images will not be selected from such inappropriate images. This embodiment is otherwise similar to the first embodiment. The image processing device in this embodiment may be the image processing device 100 in the first embodiment shown in FIG. 2. The image group setting section is not used and hence may be omitted. The process flow in this embodiment is shown in FIG. 11. Note that the process flow is the same as that shown in FIG. 3, except that the image group setting step (S135) is omitted.

Fourth Embodiment

In the first embodiment, the image group setting section groups photographed images according to the distance from the object to the photographing position, and the stereo image selection section selects stereo images from the group of images determined as belonging to one group, and specifies images photographed while the photographing position from the object to the photographing position, etc., is changing greatly, so that stereo images will not be selected from such images. In this embodiment, the image group setting section groups images photographed while the photographing position from the object to the photographing position, etc., is changing greatly into groups of inappropriate images, and the stereo image selection section selects stereo images from images excluding such groups of inappropriate images. In this case, in the image group setting step (S135), the image group setting section groups images belonging to no group of stereo images appropriate for 3D measurement, for example images approximately equal in distance from the object or magnification as well as approximately equal in photographing direction, into groups of inappropriate images. Thus, there is almost no necessity to add a process to the processes in the first embodiment. Inappropriate images may be grouped into the blocks B2, B4 and B6 in FIG. 6, for example, or may be collectively grouped into one block. This embodiment is otherwise similar to the first embodiment. The image processing device in this embodiment may be the image processing device 100 in the first embodiment shown in FIG. 2. The process flow in this embodiment is the same as that shown in FIG. 3, except that the image group setting step (S135) additionally includes grouping inappropriate images.

Fifth Embodiment

In the first embodiment, the photographing position is obtained by performing an orientation. In this embodiment, an approximate photographing position is estimated by inter-comparison of the magnifications, orientations, etc., between acquired series of photographed images. This allows the series of photographed images to be grouped according to the distance from the object to the photographing position, even if not precisely, thereby allowing efficient selection of stereo images. This embodiment is otherwise similar to the first embodiment.

Sixth Embodiment

In this embodiment, the stereo image selection section finds the relationship between the baseline length of stereo images and the measurement precision of 3D coordinates from the following relation, using the relationship that the measurement precision depends on the baseline length:

$$\Delta Z = (H \times H \times \delta P)/(f \times B)$$

where "f" represents the focal length, "H" represents the photographing distance, "B" represents the baseline length, "$\delta P$" represents the pixel resolution, and "$\Delta Z$" represents the precision.

This relation can be given in the form of a correlation table, for example. A correlation table showing the precision "$\Delta Z$" with respect to the baseline length "B" for the case where the focal length "f" is 5 mm, the photographing distance "H" is 10 m and the pixel resolution "$\delta P$" is 5 microns is given below. Using the correlation table, stereo images with a baseline length satisfying the required precision can be selected. For example, it can be seen that a baseline length of 5 m is desired to obtain a precision of 20 mm. Since the measurement precision depends on the baseline length, 3D measurement results satisfying the required precision can be obtained by determining the baseline length of stereo images according to the required precision. This embodiment is otherwise similar to the first embodiment. It should be understood that the baseline length satisfying the required precision can be obtained by computation, instead of using a correlation table.

CORRELATION TABLE

| | B (baseline length: m) | | | | | | | | | |
|---|---|---|---|---|---|---|---|---|---|---|
| | 1 | 2 | 3 | 4 | 5 | 6 | 7 | 8 | 9 | 10 |
| ΔZ (precision: mm) | 100 | 50 | 33 | 25 | 20 | 17 | 14 | 12 | 11 | 10 |

Seventh Embodiment

FIG. 12 is a block diagram showing an exemplary configuration of an image processing device 100a in a seventh embodiment. The image processing device 100a additionally includes a sensor section 200, compared to the image processing device in the first embodiment. The sensor section 200 may be, for example, an inertial sensor that can measure the position, speed, acceleration, angle or angular speed, a GPS (Global Positioning System) sensor or a posture sensor. When changes in distance to the photographing position, direction of the optical axis of the photographing device or tilt of the photographing device are detected based on changes over time in position, speed, acceleration, angle or angular speed output from the sensor section 200, the stereo image selection section 6 specifies, as inappropriate images, photographed images photographed while such changes are drastic, so that stereo images will be selected from ones excluding such specified inappropriate images. For example, if the sensor section 200 is an accelerometer, images with drastic changes, such as those photographed from the blocks B2, B4 and B6 shown in FIG. 6, are likely to be detected as images photographed during drastic changes in distance from the object to the photographing position, based on changes over time in acceleration. Thus, by specifying photographed images photographed during such changes as inappropriate images, or images belonging to groups of inappropriate images, the stereo images photographed during great changes in distance from the object to the photographing position, in photographing magnification or in photographing direction can be excluded from stereo images to be selected. Also, images not right facing to the object, such as those photographed from the blocks B9 and B11 shown in FIG. 7, are likely to be detected as images photographed during drastic changes in direction of the optical axis or tilt of the photographing device, based on changes over time in angular speed due to sway, etc., and hence can be identified. The term "during drastic changes" refers to a period during which the degree of changes exceeds a predetermined threshold, which is set according to the photographing conditions, etc. The predetermined threshold is set so as to remove photographed images having an overlapping area of 70% or less with adjacent frames, for example. This allows instantaneous removal of inappropriate images using a sensor, without the need to compare the distance from the object to the photographing position, or magnification or orientation of the photographed images. This embodiment is otherwise similar to the first embodiment.

Eighth Embodiment

In the first embodiment, the object to be photographed is stationary while the photographing device is mobile. In this embodiment, the photographing device is stationary while the object to be photographed is mobile. Also in this case, a moving object other than the intended object may intervene between the photographing device and the object, or the photographing device may sway. In such cases, feature points can be tracked to obtain the 3D coordinates of the feature points of the object in sequentially changing photographed images, such as moving images. The present invention is also applicable to a rotating object having feature points that disappear and reappear repetitively. The present invention is also applicable to each of a plurality of objects that move differently from each other.

The present invention can be implemented in the form of a computer program for causing a computer to perform the image processing method described in the above embodiments. The program may be stored in an internal memory of the control section 1, stored in a storage device internally or externally of the system, or downloaded via the Internet. The present invention may also be implemented as a storage medium storing the program.

The embodiments of the present invention have been described above. It should be understood that the present invention is not limited to the above embodiments, but various modifications may be made to the embodiments without departing from the scope of the present invention.

For example, in the above embodiments, photographed images are acquired while either one of the object or the photographing device is moving and the other is standing still. However, the present invention is also applicable to the case where both of them are moving. For example, the present invention is fully applicable to the case where one of them is moving at a constant speed in a constant direction. Even if the removal of abnormal values in the tracking step is omitted, images containing inappropriate feature points can be removed by the grouping or another process of the present invention. The grouping or another process of the present invention may be performed after peculiar feature points are removed based on the difference in movement vector beforehand in the tracking process. In the above embodiments, photographed images approximately equal in distance from the object to the photographing position, photographing magnification or photographing direction are grouped into groups of images. However, the photographed images may be grouped using other criteria. For example, the photographed images may be grouped into groups of images having an overlapping area of 50% or more. In the above embodiments, photographed images, which are photographed while the distance from the object to the photographing position, photographing magnification or photographing direction is changing greatly, are specified as inappropriate images. In addition, low-contrast images, out-of-focus images or blurred images may also be specified as inappropriate images. In some cases, of the images grouped into groups of inappropriate images, two photographed images equal in distance from the object to the photographing position may be selected as stereo images. Although a MORAVEC operator is used to extract feature points and SSDA template matching is used for the template matching in the embodiments, other operators and template matching methods may be used. The number of stereo images, the baseline length and the number of feature points may be selected appropriately.

The present invention is for use to measure the positional coordinates of a photographing device or an object to be photographed using moving images.

Description of Reference Numerals and Symbols

1: control section
2: photographed image acquisition section
3: feature extraction section
4: feature point tracking section
5: computation processing section 6: stereo image selection section
7: orientation process/3D measurement section
9: corresponding point information memory
10: image memory
11: display section
61: image group setting section
100, 100a: image processing device
200: sensor section

What is claimed is:

1. An image processing device comprising:
   a photographed image acquisition section for acquiring a series of sequentially photographed images, extracted from frames of a moving image of a relatively moving object captured continuously, where four or more adjacent images have an overlapping area with each other;
   a feature extraction section for extracting feature points from any of the sequentially photographed images;
   a feature point tracking section for tracking and correlating the feature points for the series of photographed images;
   a stereo image selection section for selecting stereo images from the series of photographed images, the stereo images being a pair of images, and
   an orientation process/3D (three dimensional) measurement section for performing an orientation and a 3D measurement using corresponding feature points, the corresponding feature points being the feature points correlated in the stereo images selected by the stereo image selection section,
   wherein the stereo image selection section has an image group setting section for grouping images selectable as the stereo images into a group of images, and selects stereo images from the group of images determined as belonging to one group by the image group setting section,
   wherein the image group setting section groups the series of photographed images into a plurality of groups of images according to a distance from the object to a photographing position as a group of images with the distance being approximately constant or according to a photographing magnification as a group of images with the photographing magnification being approximately constant, to prevent unstable precision,
   wherein the stereo image selection section specifies, as inappropriate images, photographed images photographed while the distance from the object to the photographing position, the photographing magnification or a photographing direction is changing greatly, and excludes the specified inappropriate images when grouping the series of photographed images.

2. The image processing device as recited in claim 1, further comprising:
   a photographing position measurement section for finding a position where the series of photographed images have been photographed,
   wherein the stereo image selection section uses, as the photographing position, the position found by the photographing position measurement section.

3. The image processing device as recited in claim 1,
   wherein the stereo image selection section has a correlation table defining a relationship between a baseline length of the stereo images and a measurement precision of 3D coordinates, and selects the stereo images having a baseline length satisfying a required precision based on the correlation table.

4. The image processing device as recited in claim 1, further comprising:
   a sensor section for measuring a position, speed, acceleration, angle or angular speed,
   wherein, when a change in distance from the object to a photographing position, a change in direction of an optical axis of a photographing device or a change in tilt of the photographing device are detected based on a change over time in position, speed, acceleration, angle or angular speed output from the sensor section, the stereo image selection section specifies, as inappropriate images, photographed images photographed while such changes are drastic, and selects the stereo images from photographed images excluding the specified inappropriate images.

5. The image processing device as recited in claim 1,
   wherein the image group setting section groups the series of photographed images according to the distance from the object to a photographing position and the photographing magnification.

6. An image processing device comprising:
   a photographed image acquisition section for acquiring a series of sequentially photographed images, extracted from frames of a moving image of a relatively moving object captured continuously, where four or more adjacent images have an overlapping area with each other;
   a feature extraction section for extracting feature points from any of the sequentially photographed images;
   a feature point tracking section for tracking and correlating the feature points for the series of photographed images;
   a stereo image selection section for selecting stereo images from the series of photographed images; and
   an orientation process/3D measurement section for performing an orientation and a 3D measurement using corresponding feature points, the corresponding feature points being the feature points correlated in the stereo images selected by the stereo image selection section,
   wherein the stereo image selection section specifies, as inappropriate images, photographed images photographed while a distance from the object to a photographing position, a photographing magnification or a photographing direction is changing greatly, and selects the stereo images from photographed images excluding the specified inappropriate images,
   wherein the stereo image selection section has a correlation table defining a relationship between a baseline length of the stereo images and a measurement precision of 3D coordinates, and selects the stereo images having a baseline length satisfying a required precision based on the correlation table.

7. The image processing device as recited in claim 6, further comprising:
   a sensor section for measuring a position, speed, acceleration, angle or angular speed,
   wherein, when a change in distance from the object to a photographing position, a change in direction of an optical axis of a photographing device or a change in tilt of the photographing device are detected based on a change over time in position, speed, acceleration, angle or angular speed output from the sensor section, the stereo image selection section specifies, as inappropriate images, photographed images photographed while such changes are drastic, and selects the stereo images from photographed images excluding the specified inappropriate images.

8. An image processing method comprising:
   a photographed image acquisition step of acquiring a series of sequentially photographed images, extracted from frames of a moving image of a relatively moving object captured continuously, where four or more adjacent images have an overlapping area with each other;

a feature extraction step of extracting feature points from any of the sequentially photographed images;

a feature point tracking step of tracking and correlating the feature points for the series of photographed images;

an image group setting step of grouping images from the series of photographed images into a group of images, the images to be grouped being selectable as stereo images;

a stereo image selection step of selecting the stereo images from the group of images determined as belonging to one group in the image group setting step;

an orientation step of performing an orientation using the corresponding feature points, the corresponding feature points being the feature points correlated in the stereo images selected in the stereo image selection step; and a 3D measurement step of performing a 3D measurement using orientation results in the orientation step, wherein the image group setting step groups the series of photographed images into a plurality of groups of images according to a distance from the object to a photographing position as a group of images with the distance being approximately constant or according to a photographing magnification as a group of images with the photographing magnification being approximately constant, to prevent unstable precision, wherein the stereo image selection step specifies, as inappropriate images, photographed images photographed while the distance from the object to the photographing position, the photographing magnification or a photographing direction is changing greatly, and excludes the specified inappropriate images when grouping the series of photographed images.

9. The image processing method as recited in claim 8, wherein the image group setting step groups the series of photographed images according to the distance from the object to a photographing position and the photographing magnification.

10. An image processing method comprising:

a photographed image acquisition step of acquiring a series of sequentially photographed images, extracted from frames of a moving image of a relatively moving object captured continuously, where four or more adjacent images have an overlapping area with each other;

a feature extraction step of extracting feature points from any of the sequentially photographed images;

a feature point tracking step of tracking and correlating the feature points for the series of photographed images;

a stereo image selection step of selecting stereo images from the series of photographed images, wherein photographed images photographed while a distance from the object to a photographing position, a photographing magnification or a photographing direction is changing greatly are specified as inappropriate images, and stereo images are selected from photographed images excluding the specified inappropriate images;

an orientation step of performing an orientation using corresponding feature points, the corresponding feature points being the feature points correlated in the stereo images selected in the stereo image selection step; and a 3D measurement step of performing a 3D measurement using orientation results in the orientation step, wherein the stereo image selection step has a correlation table defining a relationship between a baseline length of the stereo images and a measurement precision of 3D coordinates, and selects the stereo images having a baseline length satisfying a required precision based on the correlation table.

* * * * *